US012636644B2

(12) United States Patent
Beebe et al.

(10) Patent No.: US 12,636,644 B2
(45) Date of Patent: May 26, 2026

(54) MICROFLUIDIC PLATFORM FOR CONTROLLING AND CONFIGURING THE SPATIAL AND TEMPORAL EVOLUTION OF A GRADIENT IN A MICROFLUIDIC ENVIRONMENT

(71) Applicant: Wisconsin Alumni Research Foundation, Madison, WI (US)

(72) Inventors: David J. Beebe, Madison, WI (US); Jose Ayuso, Madison, WI (US); Maria Virumbrales Munoz, Verona, WI (US); Cristina Sanchez de Diego, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 953 days.

(21) Appl. No.: 17/752,302

(22) Filed: May 24, 2022

(65) Prior Publication Data

US 2023/0381775 A1 Nov. 30, 2023

(51) Int. Cl.
*B01L 3/00* (2006.01)

(52) U.S. Cl.
CPC ... *B01L 3/502715* (2013.01); *B01L 2200/027* (2013.01); *B01L 2200/0694* (2013.01);
(Continued)

(58) Field of Classification Search
CPC ....... B01L 2200/027; B01L 2200/0694; B01L 2300/0829; B01L 2400/0627;
(Continued)

(56) References Cited

U.S. PATENT DOCUMENTS

2005/0266582 A1* 12/2005 Modlin .................. G01N 21/77 436/164
2007/0243523 A1* 10/2007 Ionescu-Zanetti .......................... G01N 15/1459 977/924

(Continued)

OTHER PUBLICATIONS

Mark ("Aliquoting on the centrifugal microfluidic platform based on centrifugo-pneumatic valves"). Microfluid Nanofluid 10, 1279-1288. https://doi.org/10.1007/s10404-010-0759-0 (Year: 2011).*

(Continued)

*Primary Examiner* — Jennifer Wecker
*Assistant Examiner* — Jonathan Bortoli
(74) *Attorney, Agent, or Firm* — Boyle Fredrickson, S.C.

(57) ABSTRACT

A microfluidic platform is provided for controlling and configuring the evolution of a gradient. The microfluidic platform includes a plate having an outer surface and defining a chamber therein for receiving cells and/or drug/reagent particles of interest captured within a polymerized material. A plurality of wells are adapted for receiving a one or more types of desired media to form gradients in the polymerized material. The plurality of wells have first portions communicating with the outer surface of the plate and second portions communicating with the chamber. The first and second portions of the plurality of wells having corresponding widths and cross-sectional areas, and each of the plurality of wells is spaced from an adjacent well of the plurality of wells by a distance. The cross-sectional areas of the first portions of the plurality of wells are greater than the cross-sectional areas of the second portions of the plurality of wells such that the second portions of the plurality of wells form pinning valves to maintain the material to be polymer.

9 Claims, 5 Drawing Sheets

(52) U.S. Cl.
CPC .................. *B01L 2300/0829* (2013.01); *B01L 2400/0627* (2013.01)

(58) Field of Classification Search
CPC .......... B01L 3/502715; C07K 14/7051; C07K 2319/03; C12M 23/28; C12M 23/42; C12M 23/44; C12M 23/58; C12M 41/48; C12N 5/0636
See application file for complete search history.

(56) References Cited

U.S. PATENT DOCUMENTS

| | | | | |
|---|---|---|---|---|
| 2019/0009274 | A1* | 1/2019 | Novak | G01N 33/5088 |
| 2022/0195365 | A1* | 6/2022 | Magdesian | C12M 41/46 |
| 2023/0277657 | A1* | 9/2023 | Jehoulet | B01F 33/304<br>424/283.1 |
| 2024/0318117 | A1* | 9/2024 | Zobi | A61P 17/02 |

OTHER PUBLICATIONS

Beebe et al., "Microfluidic Tumor-on-a-Chip Model to Study Tumor Metabolic Vulnerability", International Journal of Molecular Sciences, Nov. 28, 2020.
Beebe et al., "Tumor-on-a-chip: a microfluidic model to study cell response to environmental gradients", The Royal Society of Chemistry, Sep. 3, 2019, pp. 3461-3471.
Ayuso et al., "Microfluidic tumor-on-a-chip model to evaluate the role of tumor environmental stress on NK cell exhaustion", Science Advances, Feb. 17, 2021.

* cited by examiner

MICROFLUIDIC PLATFORM FOR CONTROLLING AND CONFIGURING THE SPATIAL AND TEMPORAL EVOLUTION OF A GRADIENT IN A MICROFLUIDIC ENVIRONMENT

REFERENCE TO GOVERNMENT GRANT

This invention was made with government support under CA014520 awarded by the National Institutes of Health. The government has certain rights in the invention.

FIELD OF THE INVENTION

This invention relates generally to microfluidics, and in particular, to a device and method for controlling and configuring the spacial and temporal evolution of a gradient in a microfluidic environment.

BACKGROUND AND SUMMARY OF THE INVENTION

Solid tumors are highly heterogenous and plastic systems. As solid tumors grow, the accelerated tumor metabolism, combined with an insufficient blood supply to support this uncontrolled metabolism, lead to nutrient exhaustion in the tumor microenvironment (TME). Simultaneously, cellular waste products accumulate in the innermost regions of the tumor. In this context, one of the main waste products is lactic acid, which also causes a pH drop at the core of the tumor.

In view of the foregoing, it can be understood that tumor cells generate an extremely harsh microenvironment characterized by gradients of nutrient exhaustion, waste product accumulation, and pH across the solid tumor mass. As a consequence, tumor cells must undergo an extensive metabolic shift to survive amidst the nutrient-depleted TME. Among these cellular and metabolic adaptations are accelerated autophagy, overexpression of pH regulation genes (e.g., carbonic anhydrase 9), modulation of proliferation rate, or increased migration.

Previous studies have shown that as the tumor mass continues to consume the surrounding nutrients, tumor cells migrate toward the adjacent tissue searching for nutrient-rich environments that allow them to resume cell proliferation. These cyclic gradients have deep implications in tumor progression and treatment response. For example, tumor cells located in nutrient-depleted environments decrease their proliferation and can enter in a dormant or quiescent state, thereby removing the target machinery of most chemotherapies. In this context, most chemotherapies target cancer cells by disrupting the molecular machinery driving cell replication, which in turn renders dormant cancer cells immune to these therapies. Once the patients finish their chemotherapy regime and most proliferating tumor cells have been destroyed, dormant cells are left again in a nutrient-rich environment that allows them to resume cell proliferation.

Recent reports suggest that cyclic exposure to hypoxia and nutrient starvation activates compensatory mechanisms that increase tumor aggressiveness once the nutrient supply is restored. Further, nutrient starvation severely compromises the capacity of the immune system to destroy tumor cells. Effector cells such as T and natural killer (NK) cells rapidly get exhausted and lose their cytotoxic capacity as they are exposed to cyclic starvation. More importantly, this exhausted phenotype is not reversible once nutrients are replenished, crippling the capacity of these nutrient-starved immune cells to prevent tumor growth.

Despite previous research, the molecular pathways driving tumor adaptation and immune exhaustion are not completely understood. Additionally, capturing the complex and evolving TME with traditional Petri dishes remains challenging. Numerous reports have demonstrated the potential of microfluidic devices to generate biochemical gradients to study cell response. However, there exists an ongoing need to develop a microfluidic array and method that allows for a user to generate configurable gradients in a simple and robust manner. In addition, a need exists to develop a microfluidic array and method that allows for a user to generate complex gradients which mimic the viability gradients observed in in vivo tumors.

Therefore, it is a primary object and feature of the present invention to provide a device and method for controlling and configuring the spacial and temporal evolution of a gradient in a microfluidic environment.

It is a further object and feature of the present invention to provide a device and method for controlling and configuring the spacial and temporal evolution of a gradient in a microfluidic environment that allows for a user to generate gradients of various desired media or gases in a simple and robust manner.

It is a still further object and feature of the present invention to provide a device and method for controlling and configuring the spacial and temporal evolution of a gradient in a microfluidic environment that allows for a user to generate complex gradients which mimic the viability gradients observed in in vivo tumors.

In accordance with the present invention, a microfluidic platform is provided for controlling and configuring the evolution of a gradient. The microfluidic platform includes a plate having an outer surface and defining a chamber therein. A plurality of wells have first portions communicating with the outer surface of the plate and second portions communicating with the chamber. The first and second portions of the plurality of wells having corresponding widths and cross-sectional areas. Each of the plurality of wells is spaced from an adjacent well of the plurality of wells by a predetermined distance. The cross-sectional areas of the first portions of the plurality of wells are greater than the cross-sectional areas of the second portions of the plurality of wells.

The second portions of the plurality of wells act as pinning valves to prevent the flow of a material received in the chamber from flowing into the plurality of wells. The widths of the second portions of the plurality of wells are in a range of 1 millimeter to 4 millimeters, and preferably, 1.8 millimeters. The chamber has a height. The height of a chamber being in a range of 50 micrometers to 900 micrometers, and preferably, 250 micrometers. The predetermined distance is in the range of 0.1 millimeters to 5.6 millimeters, and preferably, at least 4.5 millimeters. A solution including a hydrogel and a plurality of cells may be polymerized within the chamber and at least a portion of the plurality of wells are arranged in rows and columns.

In accordance with a further aspect of the present invention, a microfluidic platform is provided for controlling and configuring the evolution of a gradient. The microfluidic platform includes a plate having an outer surface and defining a chamber therein. The chamber adapted for receiving a polymerizable material therein. A plurality of wells have first portions communicating with the outer surface of the plate and second portions communicating with the chamber. The first and second portions of the plurality of wells having corresponding widths. The widths of the first portion of the plurality of wells are greater than the widths of the second portions of the plurality of wells. The plurality of wells includes a first group of wells and a second group wells. Each second portion of the second group of wells having a cross-sectional dimension. The polymerizable material is injectable into the chamber through the first group of wells. The cross-sectional dimensions of the second portions of the second group of wells are configured to discourage the polymerizable material from flowing into the second group of wells from the chamber.

The cross-sectional dimensions of the first portions of the plurality of wells and the cross-sectional dimensions of the second portions of the plurality of wells define a ratio. The ratio is greater than 1:1. The widths of the second portions of the plurality of wells are in a range of 1 millimeter to 4 millimeters. The chamber has a height, The height of a chamber is in a range of 50 micrometers to 900 micrometers. Each of the plurality of wells is spaced from an adjacent well of the plurality of wells by a predetermined distance in the range of 0.1 millimeters to 5.6 millimeters. At least a portion of the plurality of wells are arranged in rows and columns.

In accordance with a still further aspect of the present invention, a method is provided for controlling and configuring the evolution of a gradient. The method includes the steps of providing a plate defining a chamber therein and arranging a plurality of wells is a pattern. Each of the plurality of wells communicates with the chamber. A polymerizable material is injected into the chamber through a first group of the plurality of wells and polymerized in the chamber. Medium is deposited in a user-selected one or more of the plurality of wells. The medium flows into a chamber and forming a gradient in the polymerized material.

The pattern is defined by at least a portion of the plurality of wells arranged in rows and columns. The portion of the plurality of wells are spaced from an adjacent well of the portion of the plurality of wells by a predetermined distance. The predetermined distance is in the range of 0.1 millimeters to 5.6 millimeters.

The plurality of wells have first portions and second portions communicating with the chamber. The first and second portions of the plurality of wells having corresponding widths. The widths of the first portion of the plurality of wells are greater than the widths of the second portions of the plurality of wells. The plurality of wells includes a second group of wells. Each second portion of the second group of wells has a cross-sectional dimension. The cross-sectional dimensions of the second portions of the second group of wells are configured to discourage the polymerizable material from flowing into the second group of wells from the chamber. The widths of the second portions of the plurality of wells are in a range of 1 millimeter to 4 millimeters. The chamber has a height, preferably in a range of 50 micrometers to 900 micrometers.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
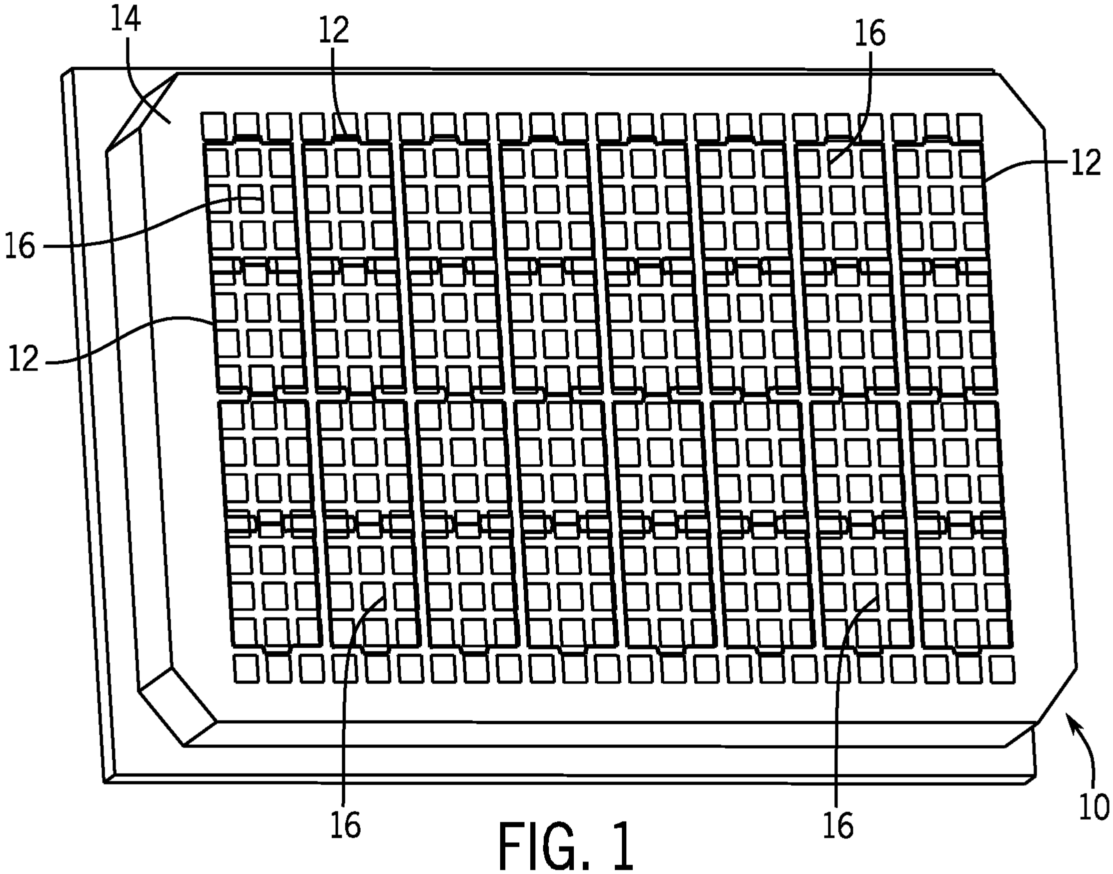
FIG. 1 is an isometric view of well plate including a microfluidic device in accordance with the present invention.

Referring to FIG. 1, a well plate adapted for a receiving a plurality of microfluidic devices for controlling and configuring the spacial and temporal evolution of a gradient is generally designated by the reference numeral 10. It is contemplated for well-plate 10 to include a predetermined number of wells 12 in outer surface 14 thereof corresponding to the number of wells in a standard microtiter well plate. As such, well plate 10 may include any number of wells therein, e.g. 32 wells, without deviating from the scope of the present invention. Each well 12 is adapted for receipting a corresponding microfluidic device 16 therein. It can be appreciated that microfluidic devices 16 are identical in structure, and as such, the description of microfluidic device 16 hereinafter provided is intended to fully describe each of the microfluidic devices 16 received within corresponding wells 12 of well plate 10, as if fully described herein.

Figure 4:
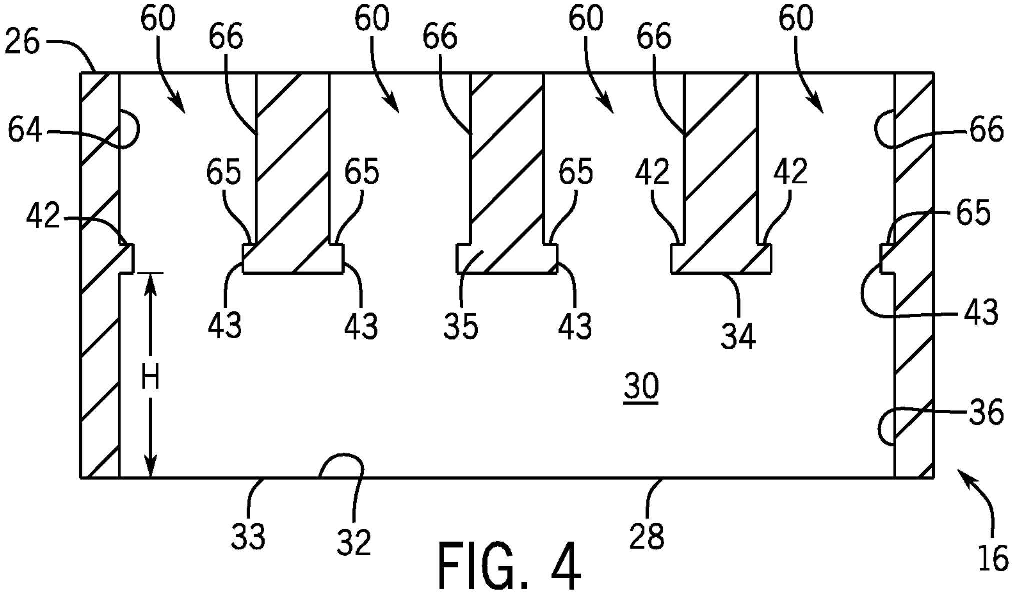
FIG. 4 is a cross-sectional view of the microfluidic device of the present invention taken along line 4-4 of FIG. 2.
Figure 5:
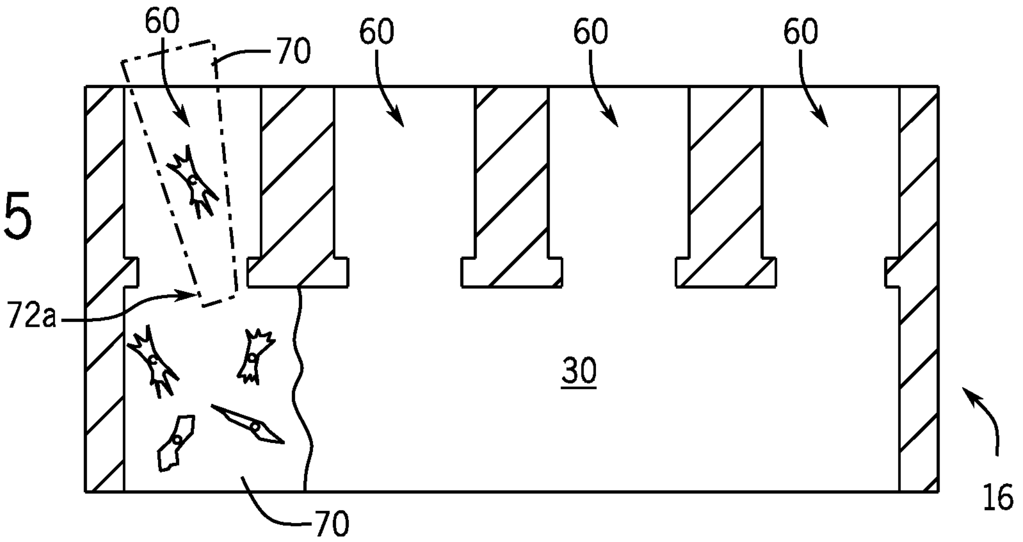
FIG. 5 is a cross-sectional view of the microfluidic device, similar to FIG. 4, showing an initial step for effectuating the methodology of the present invention.
Figure 6:
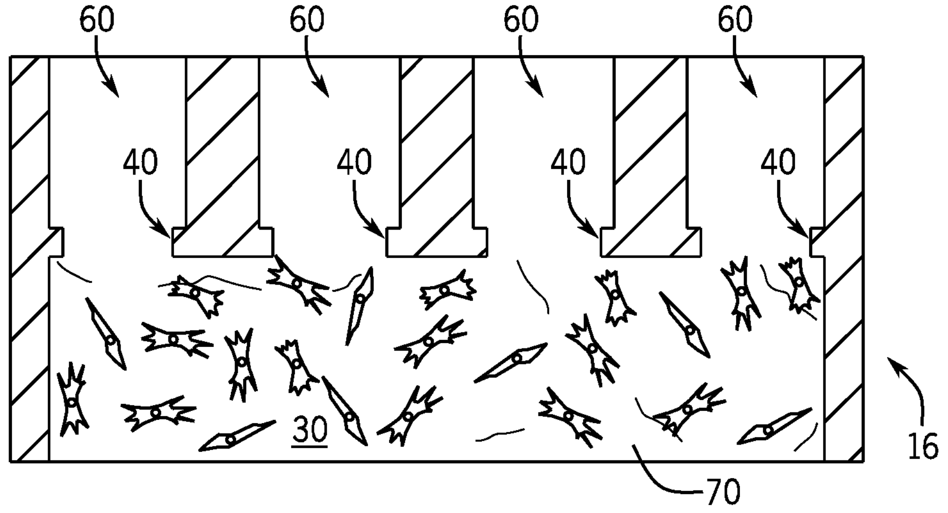
FIG. 6 is a cross-sectional view of the microfluidic device, similar to FIG. 5, showing a subsequent step for effectuating the methodology of the present invention.

It is contemplated for microfluidic devices 16 to be fabricated within corresponding wells 12 of well plate 10 or to be fabricated individually and deposited within a corresponding well 12 in outer surface 14 of well plate 10. Referring to FIGS. 2 and 4-11, each microfluidic device 16 is defined by first and second sides 18 and 20, respectively, first and second ends 22 and 24, respectively, and upper and lower surfaces 26 and 28, respectively. As best seen in FIG. 4, chamber 30 is providing within each microfluidic device 16 is defined by upwardly directed chamber surface 32 of lower wall 33, which is generally parallel to lower surface 28 of microfluidic device 16; downwardly directed chamber surface 34 of port wall 35, which is generally parallel to and spaced from lower chamber surface 32; and sidewall 36, which interconnects the outer periphery of upwardly directed chamber surface 32 to the outer periphery of downwardly directed chamber surface 34. It is intended for sidewall 36 to have a height H defining the height of chamber 30 in the range of 50 micrometers to 900 micrometers, and preferably 250 micrometers.

A plurality of ports 40 extend along corresponding axes through port wall 35 between upper surface 42 and downwardly directed chamber surface 34 and are defined by inner surfaces 43. The plurality of ports 40 are arranged in plurality of parallel rows and parallel columns. It is contemplated for each inner surface 43 to define a corresponding port 40 through port wall 35. Referring back to FIG. 2, each port 40 may have a generally square cross-section having a width W1 in the range of 1 millimeter to 4 millimeters, and preferably, 1.8 millimeters. Each port 40 is spaced from an adjacent port, e.g. port 40*a*, by a predetermined distance D1, for example, in the range of 4.5 millimeters and 5.6 millimeters, for reasons hereinafter described.

Figure 3:
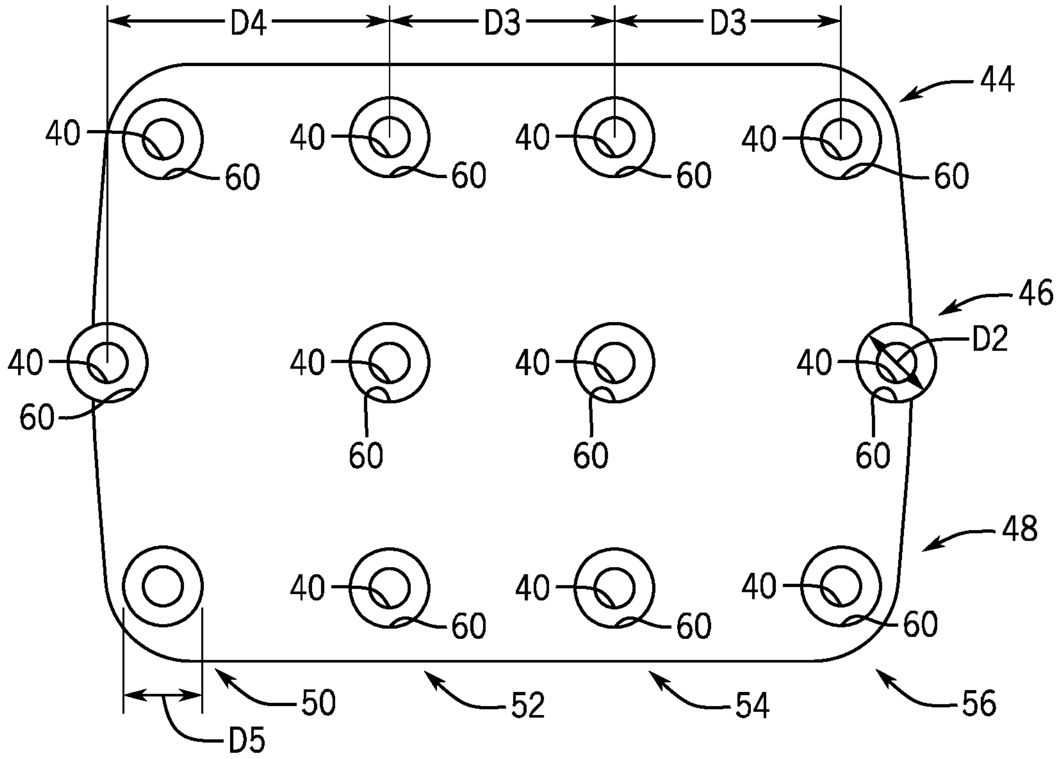
FIG. 3 is a top plan view of an alternate embodiment of a microfluidic device in accordance with the present invention.

Alternatively, each port 40 may have a generally circular cross-section having a width/diameter D2 in the range of 1 millimeter to 4 millimeters, and preferably, 1.8 millimeters, without deviating from the scope of the present invention, FIG. 3. In addition, the plurality of ports 40 may be arranged in plurality of parallel rows, generally designed by the reference numeral 44, 46 and 48 and in columns, generally designated by the reference numerals 50, 52, 54, and 56. It is noted that columns 52 and 54 of ports 40 are generally parallel to each other and ports 40 in rows 44 and 48 are spaced equidistant from each other. Preferably, each port 40 in columns 52 and 54 is spaced from an adjacent port by predetermined distance D3, for example, 4.5 millimeters. Similarly, each port 40 in rows 44 and 48 is spaced from an adjacent port by predetermined distance D3. In row 46, port 40 in column 50 is spaced from an adjacent port in column 52 by a predetermined distance D4, slightly larger than distance D3, for example, 5.6 millimeters. Similarly, port 40 in row 46 and column 56 is spaced from an adjacent port 40 in column 54 by predetermined distance D4.

Figure 2:
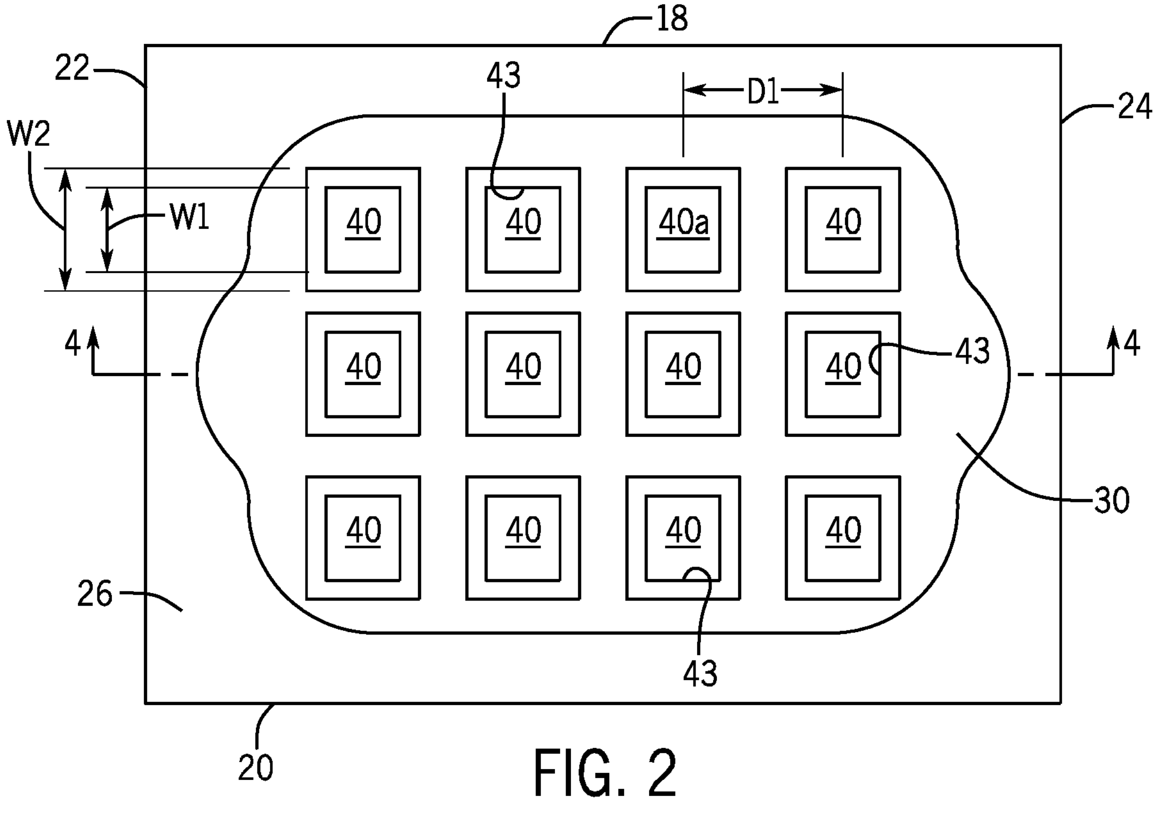
FIG. 2 is a top plan view of a microfluidic device in accordance with the present invention.

Referring back to FIG. 4, microfluidic devices 16 further includes a plurality of wells 60 therein. Each of the plurality of wells 60 are axially aligned with and extends about a corresponding one of the plurality of ports 40 and is defined by inner surface 66. Inner surface 66 defining each of the plurality of wells 60 includes an upper end 64 communicating with upper surface 26 and a lower end 65 intersecting upper surface 43 of port wall 35 and extending about a corresponding one of the plurality of ports 40. As best seen in FIG. 2, each well 60 may have a generally square cross-section having a width W2 greater than the width W1 of each of the plurality of ports 40 such that the cross-sectional area of each well 60 is greater than the cross-sectional area of each port 40. Alternatively, as best seen in FIG. 3, each well 60 may have a may have a generally circular cross-section having a width/diameter D5 greater than the width/diameter D2 of each of the plurality of ports 40 such that the cross-sectional area of each well 60 is greater than the cross-sectional area of each port 40.

In operation, unpolymerized, polymerizable material 70, e.g. a synthetic hydrogel, including cells or drug/reagent particles of interest is deposited into chamber 30. By way of example, output end 72*a* of pipette 72 may be positioned in one of the wells 60 so as to communicate with a corresponding one of ports 40, FIG. 5. It can be appreciated that polymerizable material 70 may be manually pipetted into chamber 30 or pipetted into chamber 30 by a robotic micropipetting station (not shown) which dispenses polymerizable material 70 into chamber 30 with a high degree of speed, precision, and repeatability. In order to prevent polymerizable material 70 in chamber 30 from leaking into the plurality of wells 60, the cross-sectional dimensions of and the spacing between the plurality of ports 40, as heretofore described, act as pinning valves to maintain polymerizable material 70 in chamber 30 and to prevent polymerizable material 70 from flowing into the plurality of wells 60. Once chamber 30 is filled polymerizable material 70, polymerizable material 70 is polymerized within chamber 30 after a predetermined time period, e.g. 15 minutes, FIG. 6.

Figure 7:
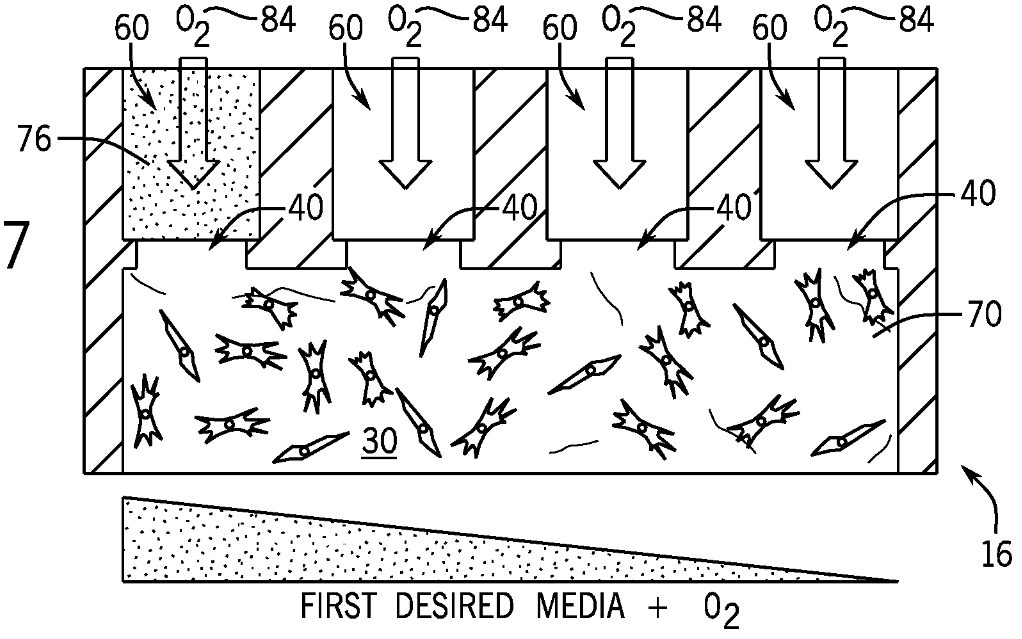
FIG. 7 is a cross-sectional view of the microfluidic device, similar to FIG. 6, showing a further step for effectuating the methodology of the present invention.
Figure 8:
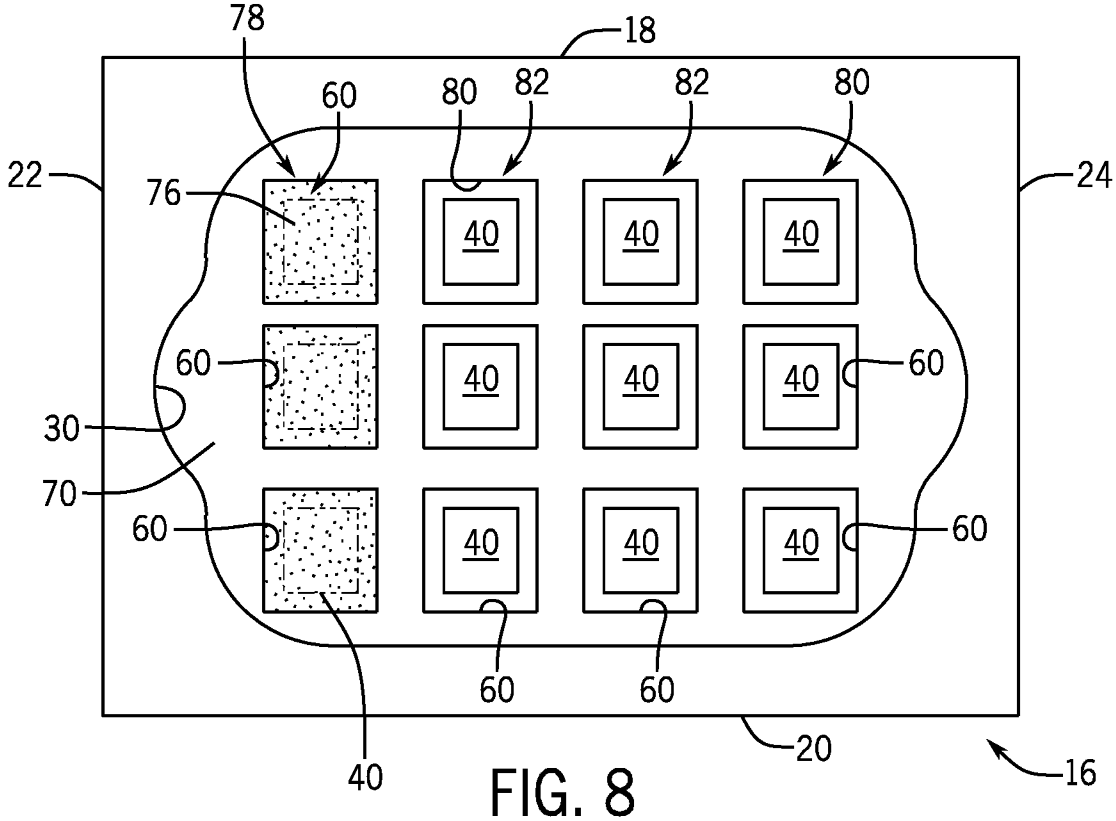
FIG. 8 is a top plan view of the microfluidic device of FIG. 7.

Referring to FIGS. 7-8, in order to study the effects of one or more desired media, e.g, nutrients, cells, cytokines, etc., on the cells or drug/reagent particles of interest within polymerized material 70, first desired media 76 is deposited in one or more user selected wells 60 of the plurality of wells 60 in microfluidic device 16, hereinafter designated first group 78 of wells 60. First desired media 76 passes through corresponding ports 40 in microfluidic device 16 in communication with first group 78 of wells 60 and diffuses into polymerized material 70 in chamber 30. Over time, after first desired media 76 diffuses through corresponding ports 40 in microfluidic device 16, a gradient of first desired media 76 is formed in polymerized material 70 extending outwardly away from ports 40 in communication with first group 78 of wells 60 through which first desired media 76 passed. It can be understood that by varying the number and location of wells 60 in first group 78 of wells 60 in which first desired media 76 is deposited, a user may control and configure the spacial and temporal evolution of the gradient formed in polymerized material 70 in chamber 30 of microfluidic device 16. It is further noted that depending on the composition of first desired media 76, atmospheric gases, such as oxygen 84, may pass through first desired media 76 in corresponding ports 40 in communication with third group 82 of wells 60 in microfluidic device 16 and diffuse into polymerized material 70 in chamber 30. Over time, after oxygen 84 diffuses through corresponding ports 40 in communication with third group 82 of wells 60 in microfluidic device 16, a gradient of oxygen 84 is also be formed in polymerized material 70 extending outwardly away from the ports 40 in communication with third group 82 of wells 60 through which oxygen 84 passed.

Figure 9:
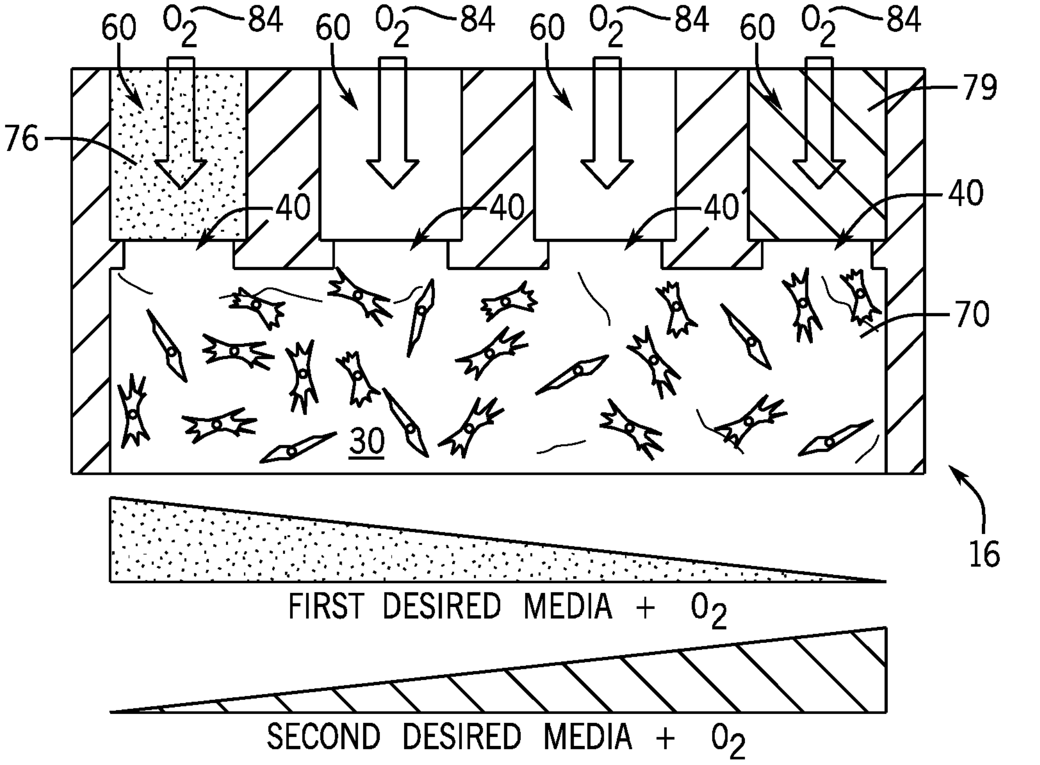
FIG. 9 is a cross-sectional view of the microfluidic device, similar to FIG. 7, showing a still further step for effectuating the methodology of the present invention.

Referring to FIG. 9, in order to study the effects of a second media, e.g, nutrients, cells, cytokines, etc., on the cells or drug/reagent particles of interest within polymerized material 70, second desired media 79 is deposited in one or more user selected wells 60 of the plurality of wells 60 in microfluidic device 16, hereinafter designated second group 80 of wells 60, FIG. 8. Second desired media 79 pass through corresponding ports 40 of second group 80 of wells 60 in microfluidic device 16 and diffuses into polymerized material 70 in chamber 30. Over time, after second desired media 79 diffuses through corresponding ports 40 of second group 80 of wells 60 in microfluidic device 16, a gradient of second desired media 79 is formed in polymerized material 70 extending outwardly away from the ports 40 in communication with second group 80 of wells 60 through which second desired media 79 has passed. As noted above, it can be understood that by varying the number and location of second group 80 of wells 60 in which second desired media 79 is deposited, a user may control and configure the spacial and temporal evolution of the gradient formed by second desired media 79 in polymerized material 70 in chamber 30 of microfluidic device 16.

As noted above, in order to study the effects of an atmospheric gas, such as oxygen, on the cells or drug/reagent particles of interest within polymerized material 70, one or more user selected wells 60 of the plurality of wells 60 in microfluidic device 16, hereinafter designated third group 82 of wells 60, may be left unfilled so as to be exposed to the environment external to microfluidic device or interconnected to a source (not shown) of a desired gas, such as oxygen 84. Oxygen 84 passes through corresponding ports 40 in communication with third group 82 of wells 60 in microfluidic device 16 and diffuses into polymerized material 70 in chamber 30. Over time, after oxygen 84 diffuses through corresponding ports 40 in communication with third group 82 of wells 60 in microfluidic device 16, a gradient of oxygen 84 is formed in polymerized material 70 extending outwardly away from the ports 40 in communication with third group 82 of wells 60 through which oxygen 84 passed. Again, it can be understood that by varying the number and location of third group 82 of wells 60 in which oxygen 84 communicates, a user may control and configure the spacial and temporal evolution of the gradient of oxygen 84 formed in polymerized material 70 in chamber 30 of microfluidic device 16.

Figure 10:
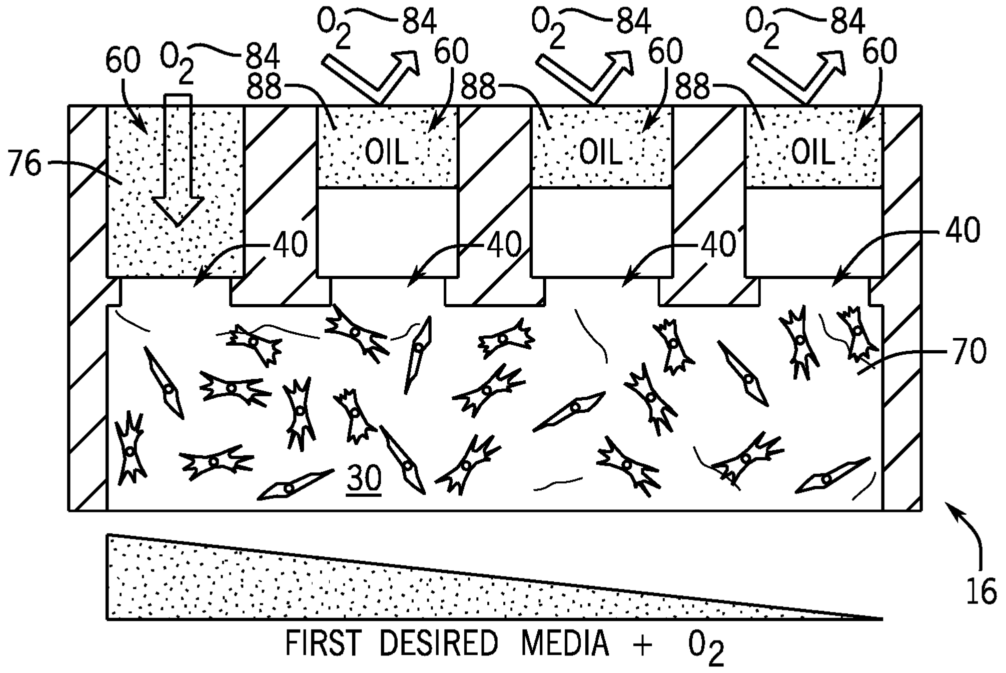
FIG. 10 is a cross-sectional view of the microfluidic device, similar to FIG. 7, showing an alternate for effectuating the methodology of the present invention.

Referring to FIG. 10, in order to prevent or limit the ability of a gas, such as oxygen 84, from interacting with the cells or drug/reagent particles of interest within polymerized material 70, one or more user selected wells 60 of the plurality of wells 60 in microfluidic device 16, e.g. second and third groups 80 and 82, respectively, of wells 60, may be filled with a barrier fluid, e.g. oil 88, so as to prevent the environment external to microfluidic device 16 from communicating with polymerized material 70 in chamber 30 through corresponding ports 40 in communication with second and third groups, 80 and 82, respectively, of wells 60 in microfluidic device 16. More specifically, oil 88 acts to prevent the environment external to microfluidic device 16 from communicating with polymerized material 70 in chamber 30 through corresponding ports 40 in communication with selected wells 60, e.g. second and third groups, 80 and 82 respectively, of wells 60 in microfluidic device 16.

Figure 11:
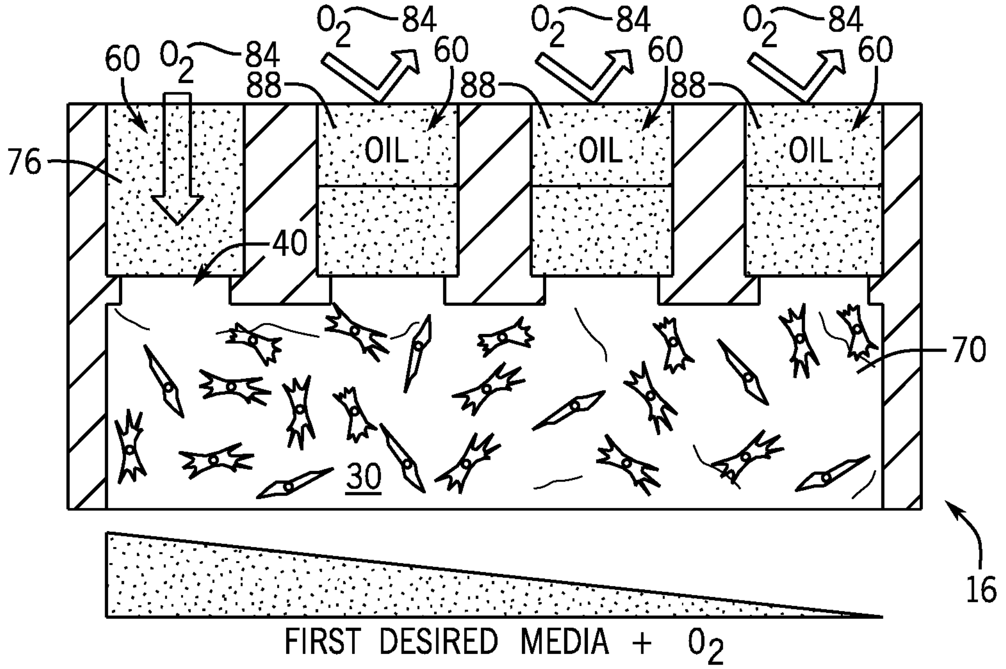
FIG. 11 is a cross-sectional view of the microfluidic device, similar to FIG. 7, showing a further alternate step for effectuating the methodology of the present invention.

In addition, referring to FIG. 11, oil 88 may be used as to prevent the environment external to microfluidic device 16, e.g. oxygen 84, from passing through a desired media, e.g. first and second desired medias 80 and 82, respectively, and interacting with the cells or drug/reagent particles of interest within polymerized material 70. By way of example, after first desired media 76 is deposited in one or more user selected wells 60 of the plurality of wells 60 in microfluidic device 16, a layer of oil 88 may be deposited on first desired media 76 in the one or more of the user selected wells 60. Oil 88 acts to prevent the environment external to microfluidic device 16, e.g. oxygen 84, from passing through first desired media 76 in the user selected wells 60 and communicating with polymerized material 70 in chamber 30.

It can be appreciated that utilizing the same methodology heretofore described, a user may create gradients from one or more types of media or gas simply by loading one or more of the plurality of wells 60 with one or more type(s) of media or gas. The user may limit or prevent the environment external to microfluidic device 16, e.g. oxygen 84, from passing through a desired media and interacting with the cells or drug/reagent particles of interest within polymerized material 70 by depositing a layer of a barrier fluid, e.g. oil 88, over the desired media in a corresponding well. The spacial and temporal evolution of the gradient or gradients formed in polymerized material 70 in chamber 30 of microfluidic device 16 by the one or more type(s) of media or gas may be controlled and configured by simply varying the number and location of the one or more of the plurality of wells 60 loaded with the one or more type(s) of media or gas.

Various modes of carrying out the invention are contemplated as being within the scope of the following claims particularly pointing out and distinctly claiming the subject matter that is regarded as the invention.

We claim:

1. A microfluidic platform for controlling and configuring an evolution of a gradient, the microfluidic platform comprising:

a plate having a plate outer surface and defining a chamber in the plate; and a plurality of wells including at least four or more wells arranged in a plurality of rows and a plurality of columns;

wherein:

each well of the plurality of wells has a first portion and a second portion;

the first portion has a first width and a first cross-sectional area and is in fluidic communication with the plate outer surface;

the second portion has a second width and a second cross-sectional area and is in fluidic communication with the chamber;

each well is spaced from an adjacent well by a predetermined distance;

the first cross-sectional area is greater than the second cross-sectional area; and the chamber is unitary and has a chamber length and a chamber width sized to overlap the second portion of each well such that the chamber fluidly communicates with the second portion of each well.

2. The microfluidic platform of claim 1 wherein each of the plurality of wells includes a corresponding pinning valve at the second portion of a corresponding well, the corresponding pinning valves configured to prevent material within the chamber from flowing into the corresponding wells.

3. The microfluidic platform of claim 1 wherein the second width is between 1 and 4 millimeters.

4. The microfluidic platform of claim 3 wherein the second width is 1.8 millimeters.

5. The microfluidic platform of claim 1 wherein the chamber has a chamber height between 50 and 900 micrometers.

6. The microfluidic platform of claim 5 wherein the chamber height is 250 micrometers.

7. The microfluidic platform of claim 1 wherein the predetermined distance is between 0.1 and 5.6 millimeters.

8. The microfluidic platform of claim 7 wherein the predetermined distance is between 4.5 and 5.6 millimeters.

9. The microfluidic platform of claim 1 further comprising a polymer in the chamber formed from a solution including a hydrogel and a plurality of biological cells polymerized within the chamber.

* * * * *